United States Patent [19]

Okazaki

[11] Patent Number: 4,770,505
[45] Date of Patent: Sep. 13, 1988

[54] OPTICAL ISOLATOR
[75] Inventor: Kazuhide Okazaki, Tokyo, Japan
[73] Assignee: Hoya Corporation, Tokyo, Japan
[21] Appl. No.: 716,116
[22] Filed: Mar. 26, 1985
[30] Foreign Application Priority Data Mar. 27, 1984 [JP] Japan ................................. 59-57439

[51] Int. Cl.⁴ ..................... G02B 5/30; G02B 27/28; G02F 1/03
[52] U.S. Cl. .................................. 350/377; 350/394
[58] Field of Search ............... 350/377, 394, 401, 402, 350/170, 400

[56] References Cited

U.S. PATENT DOCUMENTS

| 548,701 | 10/1895 | Crehore | 350/377 |
| 3,267,804 | 8/1966 | Dillon | 350/377 |
| 3,625,590 | 12/1971 | Habegger | 350/400 X |
| 3,632,187 | 1/1972 | Habegger | 350/401 X |
| 3,734,625 | 5/1973 | Aagard | 350/377 |
| 3,746,983 | 7/1973 | Renz | 350/377 |
| 4,117,399 | 9/1978 | Ono et al. | 350/377 |
| 4,553,822 | 11/1985 | Mahlein | 350/377 |

FOREIGN PATENT DOCUMENTS

| 0075107 | 3/1983 | European Pat. Off. | 350/402 |
| 60-87442 | 5/1985 | Japan | 350/401 |
| 2038022 | 7/1980 | United Kingdom | 350/377 |

Primary Examiner—John K. Corbin
Assistant Examiner—David J. Edmondson
Attorney, Agent, or Firm—Blakeley, Sokoloff, Taylor & Zafman

[57] ABSTRACT

In an optical isolator, at least one of two polarizers has a polarizing beam splitter whose main section has a rhombic shape, and input and output end faces of the polarizing beam splitters are inclined with respect to the optical path of incident light. The angle of light incident on the bonding surface of the prisms constituting the rhombic polarizing beam splitter can be optimized, and return of the reflected light can be eliminated, thereby improving the performance of the optical isolator.

4 Claims, 4 Drawing Sheets

OPTICAL ISOLATOR

BACKGROUND OF THE INVENTION

The present invention relates to an optical isolator using a Faraday rotator. Optical isolators have been applied to optical communications such as in systems using optical fibers to unidirectionally transmit light. This type of optical isolator prevents light reflected by an optical component such as a connector or an optical switch from being returned to a laser source, thereby stabilizing laser oscillation.

FIG. 1 shows an arrangement of a conventional optical isolator.

Referring to FIG. 1, light I coming along the direction indicated by an arrow enters a polarizer 1 and then is linearly polarized. The linearly polarized light from the polarizer 1 is transmitted to a Faraday rotator 3 made of paramagnetic glass placed in a magnetic field produced by magnets 2. The polarization direction of the light is rotated by the Faraday rotator 3 and the rotated and polarized light is transmitted to a polarizer 4. Since the polarization axis of the polarizer 4 substantially coincides with the polarization direction of light emitted from the Faraday rotator 3, the light from the Faraday rotator 3 is transmitted through the polarizer 4 However, when light reaching the Faraday rotator 3 from the side of the polarizer 4 is transmitted to the polarizer 1 through the Faraday rotator 3, it is blocked since the polarization direction of the light emitted from the Faraday rotator 3 does not coincide with the polarization axis of the polarizer 1 (i.e., in general, the polarization direction is perpendicular to the polarization axis). Reflection and antireflection films are coated on the end faces of the Faraday rotator 3, and the incident light is reflected in a zig-zag manner so as to obtain a large Faraday rotation angle.

Cubic polarizing beam splitters or Glan-Taylor polarizing prisms are used to constitute the polarizers 1 and 4. The cubic polarizing beam splitter comprises two isosceles triangular prisms having identical shape and size. The main sectional surface of each prism perpendicular to a corresponding lateral edge has an isosceles triangular shape. The base surfaces of these two isosceles triangular prisms are bonded through a polarizing film. The input and output end faces of the cubic polarizing beam splitter or the Glan-Taylor polarizing prism are perpendicular to the optical path of the incident light. For this reason, light reflected by the input and output end faces returns along the same path as the incident optical path, thereby impairing performance of the optical isolator for preventing return of light.

In order to solve the above problem, each polarizer can be inclined with respect to the optical path of the incident light to prevent the reflected light from being returned along the same optical path as that of the incident light. However, when the polarizer is inclined by an angle of 5° or more with respect to the optical path of the incident light, the angle of incidence of light on the bonding surface of the prisms is inevitably deviated from an optimal value (45°). As the result a ratio Tp/Ts (i.e., an extinction ratio of a transmittance of a p wave to that of an s wave) is lowered. More specifically, as shown in FIG. 2, the extinction ratios at an incident angle $\theta_1$ of the incident light at the end face of the polarizer and at an incident angle $\theta_3$ of the incident light to the bonding surface of the prisms are greatly lowered when the incident angles $\theta_1$ and $\theta_3$ are more than 7.5° (less than −7.5°) and less than 40° (more than 50°), respectively.

Even if an inclination angle of the polarizer is small, when a distance between a light source and the polarizer is increased, it is possible to prevent the reflected light from being returned to the light source. However, the size of the overall optical system is increased. In addition, although it is possible to coat antireflection films on the input and output end faces, reflection cannot be completely eliminated.

SUMMARY OF THE INVENTION

It is, therefore, a principal object of the present invention to provide an optical isolator wherein light reflected by input and output end faces of a polarizer will not be returned along the same optical path as that of incident light, and unidirectional transmission of the incident light is ensured.

In order to achieve the above object of the present invention, at least one of the polarizers comprises a polarizing beam splitter with a rhombic (excluding square) main section, that is, a rhombic polarizing beam splitter instead of a cubic polarizing beam splitter. Therefore the input and output end faces of the beam splitter are inclined with respect to the optical path of the incident light, and the incident angle on the bonding surface can be optimized.

DESCRIPTION OF THE PREFERRED EMBODIMENT

Figure 1:
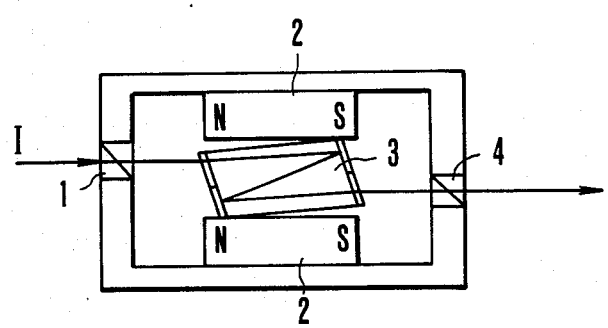
FIG. 1 is a schematic view showing a conventional optical isolator.
Figure 3:
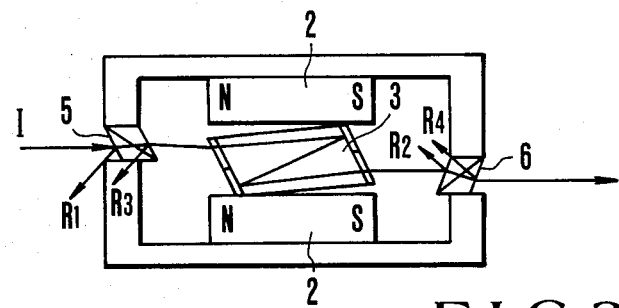
FIG. 3 is a schematic view showing an optical isolator according to an embodiment of the present invention.

FIG. 3 shows an optical isolator according to an embodiment of the present invention. Unlike the conventional optical isolator shown in FIG. 1, rhombic beam splitters 5 and 6 with rhombic main sections are used as polarizers.

Figure 4:
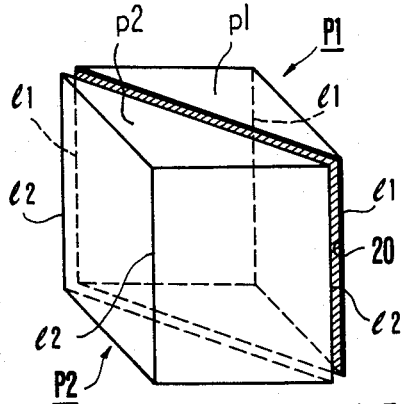
FIG. 4 is a perspective view for explaining main sections of a rhombic polarizing beam splitter.

The main section of the rhombic beam splitter is defined as the section perpendicular to bonding surfaces p1 and p2 thereof and to lateral edges 11 and 12 of the prisms when two isosceles triangular prisms P1 and P2 are bonded through a polarizing film 20, as shown in FIG. 4.

Figure 2:
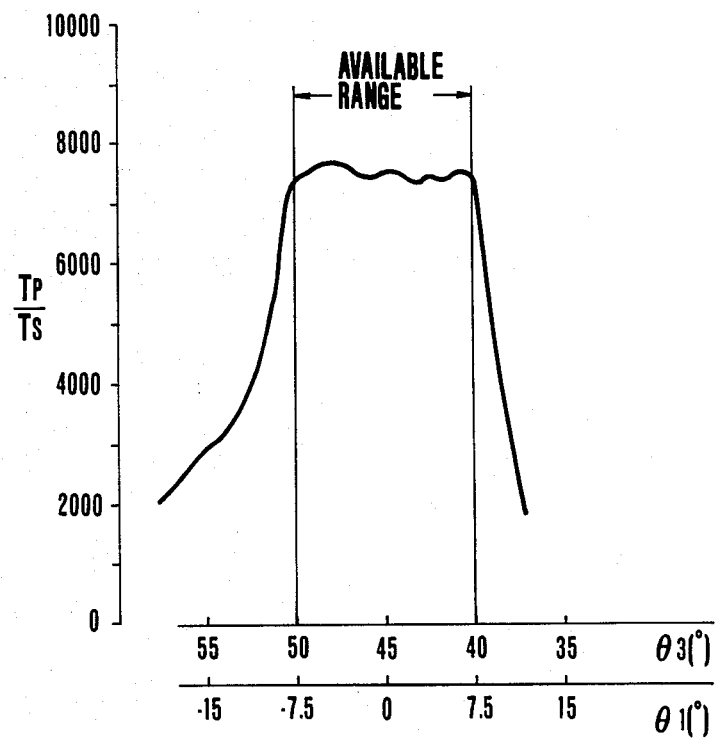
FIG. 2 is a graph showing the extinction ratio at an incident angle $\theta_1$ of the incident light at the end face of the polarizer and at an incident angle $\theta_3$ of the incident light of a cubic polarizing beam splitter.
Figure 5:
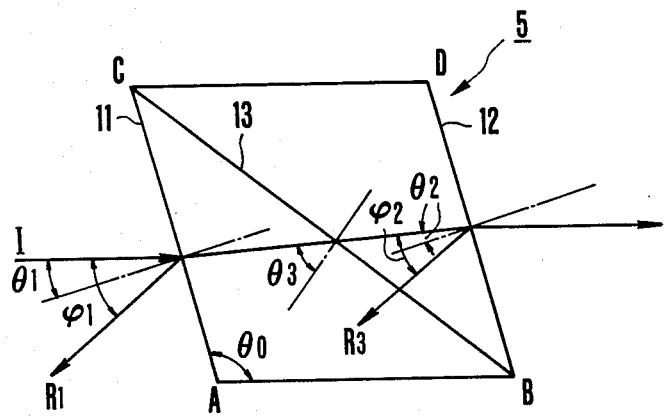
FIG. 5 is a detailed view showing the rhombic polarizing beam splitter.

As shown in FIG. 5, the rhombic polarizing beam splitter 5 is comprised of two prisms each having main sections of an isosceles triangle with a vertex $\theta 0 = 105°$. Light I reaches an input end face 11 at an angle $\theta 1 = 15°$. Each prism comprises BSC-7 glass available from HOYA CORPORATION, Japan and has a refractive index $n2 = 1.52$ with respect to the air refractive index $n1 = 1$. The incident light I is refracted by the input end face 11, and the refracted light is then incident on an output end face 12 at an angle $\theta 2 = 9.8$. For this reason, light R1 reflected by the input end face 11 is reflected at an angle $\phi 1 = 2\theta 1 = 30°$ with respect to the optical path of the incident light, and light R3 reflected by the output end face 12 is reflected at an angle $\phi 2 = 2\theta 2 \div 19.6°$. The reflected light R1 and the reflected light R3 are greatly deviated from the incident light I and will not return to the light source. Since the main section has the rhombic (excluding square) shape, the input and output end faces 11 and 12 can be inclined with respect to the incident light I. Unlike the case wherein the cubic polarizing beam splitters are inclined, the incident angle $\theta 3$ on the bonding surface 13 (polarizing film 20) can be $\theta 3 = 47.5°$. As a result, the extinction ratio (Tp/Ts) of the polarizing beam splitter 5 of this embodiment is about 7,600:1 since it corresponds to the extinction ratio (a curve in FIG. 2) given when the incident angle $\theta 3$ on the bonding surface 13 is 47.5°. Therefore, proper polarization can be performed in the same manner as in the case of an optimal incident angle of 45° in the conventional beam splitter.

The above description exemplifies the polarizing beam splitter 5. However, the same description can be applied to the polarizing beam splitter 6, except for the differences in angles.

Figure 6A:
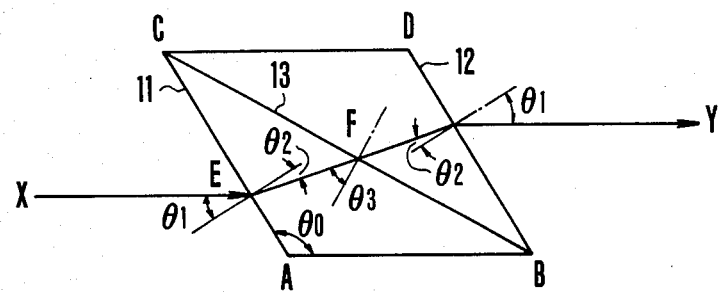
FIGS. 6A and 6B are respectively schematic views for explaining the relationships among the incident angle on the input end face of the beam splitter, the bonding surface having the polarizing film, and the incident angle on the output end face of the beam splitter.
Figure 6B:
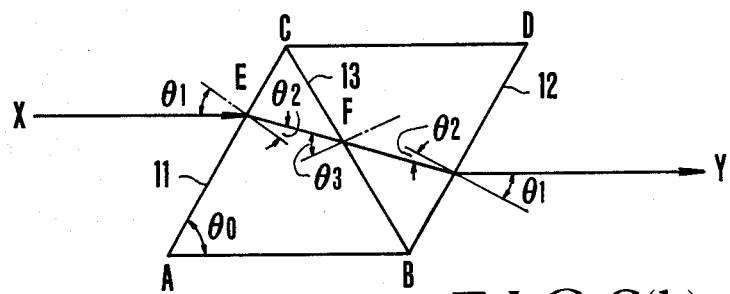

The behavior of the rhombic polarizing beam splitter will be analyzed with reference to FIGS. 6A and 6B. The angle $\theta 0$ (the vertex ($<A$) of an isosceles triangle ABC) is given as $90° + \theta$ where $\theta$ falls within the range of $90° > \theta > 0$ in FIG. 6A, and the range of $-90° > \theta > 0$ in FIG. 6B. Referring to FIGS. 6A and 6B, by the definition of a rhombus:

$$\overline{AB} = \overline{BD} = \overline{DC} = \overline{AC}$$

If condition $<A = <D = 90° + \theta$ is given, the following relation is established:

$$<ACB = <ABC = <DCB = <DBC = 45° - \theta/2$$

In addition, when an optical path of light incident in parallel with AB and CD is defined as XY, $$\theta 1 = \theta \quad (1)$$

When an ambient refractive index and a prism refractive index are given as n1 and n2, respectively:

$$\sin\theta 1 / \sin\theta 2 = n2/n1$$

therefore $$\theta 2 = \sin^{-1}(n1 \sin \theta 1 / n2) \quad (2)$$

When angle $<CFE$ is considered, the following relation is established:

$$(90° - \theta 3) = 180° - (45° - \theta/2) - (90° + \theta 2)$$

therefore $$\theta 3 = 45° - \theta/2 + \theta 2 \quad (3)$$

Figure 7:
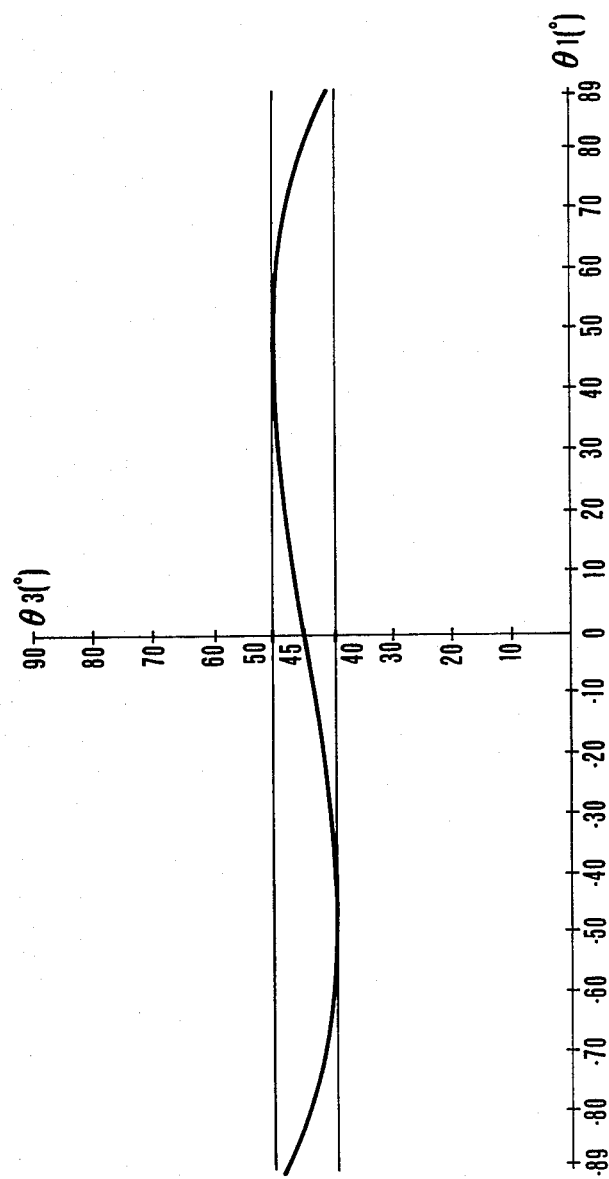
FIG. 7 is a graph showing the results of the relationships shown in FIGS. 6A and 6B.

When $\theta = \theta 1$ changes from $-89°$ to $89°$ in accordance with equations (1) to (3) for $n1 = 1$ (air) and $n2 = 1.52$ (BSC-7 glass), the range of angles $\theta 3$ is summarized in FIG. 7. As understood from FIG. 2, the available range of the incident angles $\theta 3$ of the incident light to the bonding surfaces is $40° < \theta 3 < 50°$. Therefore, according to the present invention, the incident angle $\theta 1$ can vary from $-89°$ to $89°$. In other words, according to the present invention, even if the incident angle $\theta 1$ of the rhombic polarizing beam splitter changes from $-89°$ to $89°$, a high extinction ratio (Tp/Ts) can be obtained by maintaining the incident angle $\theta 3$ to the bonding surface between 40° and 50°.

In the above embodiment, the present invention is exemplified by an optical isolator having a combination of rhombic polarizing beam splitter and a paramagnetic glass Faraday rotator. Howeever, the material of the Faraday rotator will not be limited to paramagnetic glass but to diamagnetic glass or YIG. In the above embodiment, light is reflected twice inside the Faraday rotator in order to increase the rotation angle. However, the number of times of reflection is not limited to two, nor need the light be reflected in the Faraday rotator. The Faraday rotator used in the present invention does not have any restriction.

Figure 8:
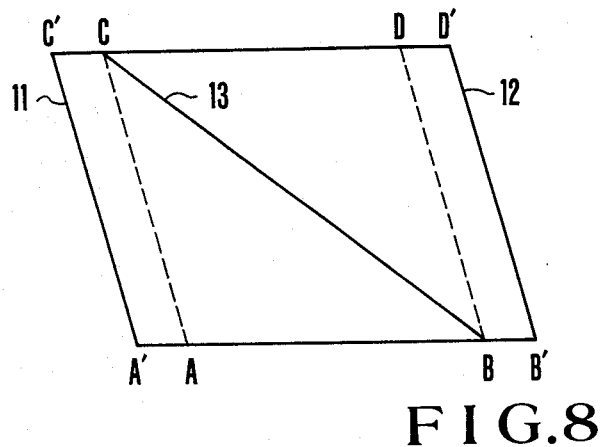
FIG. 8 is a schematic view showing a modification of the optical isolator according to the present invention.

The two prisms having the isosceles triangular main sections perpendicular to the lateral edges are used to constitute a rhombic polarizing beam splitter in the above embodiment. However, as shown in a modification in FIG. 8, even if the input and output end faces AC and BC are translated as represented by lines A'C' and B'D', the same effect as in the above embodiment can be obtained. Therefore, the modification in FIG. 8 is included as an equivalent in the concept of the rhombic polarizing beam splitter of the present invention.

Furthermore, the bonded surfaces of the rhombic beam splitters 5,6 can be inclined as shown in FIG. 3, i.e. such that extensions of, or the bonded surfaces may be parallel to one another.

According to the optical isolator of the present invention, at least one of the polarizers comprises a polarizing beam splitter whose main section has a rhombic shape, and input and output end faces of the polarizing beam splitters are inclined with respect to the optical path of incident light. The angle of light incident on the bonding surface of the prisms constituting the rhombic polarizing beam splitter can be optimized, and return of the reflected light can be elminated, thereby improving the performance of the optical isolator.

What is claimed is:

1. An optical isolator comprising:
   a first polarizer for outputting incident light as linearly polarized light;
   a Faraday rotator for rotating a polariztion direction of the linearly polarized light from said first polarizer through a predetermined angle in a magnetic field in accordance with a Faraday effect; and
   a second polarizer for linearly polarizing light output from said Faraday rotator,
   wherein at least one of said first and second polarizers comprises two prisms which are bonded through a polarizing film to constitute a polarizing beam splitter with a rhombic main section perpendicular to lateral edges of said prism as a whole, one internal angle of said rhombic main section being an acute angle, and the incident light being incident at an oblique inclination angle on the input end face of said polarizing beam splitter.

2. An isolator according to claim 1, wherein each of said first and second polarizers comprises said two prisms bonded through said polarizing film, said two prisms being adapted to constitute the polarizing beam splitter with the rhombic main section perpendicular to the lateral edges of said prisms, said one internal angle of the rhombic main section being an acute angle.

3. An isolator according to claim 1, wherein said first and second polarizers have bonding surfaces inclined in parallel.

4. An isolator according to claim 1, wherein said first and second polarizers have bonding surfaces inclined so that extensions of the bonding surfaces are crossed.

* * * * *